United States Patent [19]

Smith

[11] 4,248,672
[45] Feb. 3, 1981

[54] DISTILLATION APPARATUS

[75] Inventor: Verity C. Smith, Dedham, Mass.

[73] Assignee: Vaponics Inc., Plymouth, Mass.

[21] Appl. No.: 66,048

[22] Filed: Aug. 13, 1979

[51] Int. Cl.³ .............................................. B01D 3/02
[52] U.S. Cl. ...................................... 203/11; 203/74; 203/80; 203/81; 203/91
[58] Field of Search ............... 202/163, 172, 173, 181, 202/182, 185 A, 185 R, 185 C, 185 D, 185 E, 186, 187, 195, 196, 197, 199, 200, 202, 177; 203/11, 71, 73, 74, 80, 81, 91

[56] References Cited

U.S. PATENT DOCUMENTS 3,489,649  1/1970  Weiss ................................... 202/197
3,975,241  8/1976  Smith .......................... 203/DIG. 17

*Primary Examiner*—Frank Sever
*Attorney, Agent, or Firm*—Kenway & Jenney

[57] ABSTRACT

In an apparatus for distilling liquids an improvement is provided wherein distillate is heated within an auxiliary reboiler for further removal of volatile impurities, with the operating environment of the auxiliary reboiler being isolated from the main ambient atmosphere of the apparatus so that evaporated impurities can be vented without recontaminating the distillate or impairing the efficiency of the apparatus. Countercurrent flow of distillate and vapors within the auxiliary reboiler produces enhanced purity of the distillate.

2 Claims, 2 Drawing Figures

DISTILLATION APPARATUS

BACKGROUND OF THE INVENTION

This invention relates generally to water distillation and more specifically to an improvement in a distillation apparatus in which successive stages of redistillation are provided, so as to achieve a greater degree of purity.

Distillation of water or other liquids through the process of evaporation followed by condensation of the vapor is a well-known art, known to mankind for centuries. Typically when it is desired to separate a liquid from suspended impurities or from components having considerably higher boiling points the procedure calls for raising the temperature of the feed liquid, vaporizing the liquid in question, while leaving the undesired impurities behind in their solid or liquid states, and then condensing the now-pure vapor and collecting the condensate. However, despite sophisticated distillation apparatuses, a problem still exists in achieving advanced levels of purity when a particular class of contaminants is involved. In some sensitive applications just a few parts per million of these contaminants remaining in a distillate will be enough to produce significant problems. A particularly troublesome problem exists when trying to separate a liquid from volatile impurities having boiling points close to its own boiling point. Silicon hexafluoride is an example of such a substance having a boiling point close to the 212° F. boiling point of water, and therefore significant reduction of this contaminant is extremely difficult to achieve using conventional stills. Once a typical distillation apparatus has attained a steady-state operating condition, the amount of volatile impurities which also have been boiled off from the feed liquid begin to build up and saturate the ambient atmosphere within the apparatus. Once the ambient atmosphere has become saturated and an equilibrium condition has been established between the condensates and the volatile impurities in the ambient atmosphere, not only will the efficiency of the apparatus become impaired but the absolute degree of purity achievable by the apparatus will become limited. U.S. Pat. No. 3,975,241 attempted to increase the degree of purity achievable by conventional stills by introducing a reboiler located within the interior of the still which would collect the condensate and reboil it, thereby boiling off additional amounts of impurities. However, the efficacy of this modification was somewhat limited because by being located within the interior of the still, the ambient atmosphere surrounding the distillate was in communication with the main ambient atmosphere of the still itself and therefore an equilibrium condition quickly arose between the two atmospheres which limited the amounts of volatile impurities that could be boiled off from the distillate. Because of the saturated condition of the ambient atmosphere the undesirable vapors would tend to condense almost immediately after being evaporated and fall back into the distillate, thereby recontaminating it. Although the main ambient atmosphere of the still was vented to a certain degree to the outside world, the essentially closed system within the still limited the ultimate reduction in trapped volatile impurities achievable by the reboiling process.

It is an object of this invention to enhance the ability of distillation apparatuses to achieve significant reduction of the amount of volatile components within a distillate, particularly of those components with boiling points close to the boiling point of the distillate, and to do so in a simple and relatively inexpensive manner.

It is a further object of this invention to minimize the likelihood of vaporized impurities recontaminating a purified distillate.

It is still a further object of this invention to provide additional stages of reboiling in a manner which may be readily adaptable to existing stills without significant structural or mechanical modifications thereto.

SUMMARY OF THE INVENTION

The invention resides in the improvement to a conventional distillation apparatus which already includes a vented housing enclosing a still, a condenser and a main reboiler.

Specifically the improvement comprises a plurality of serially intercommunicating auxiliary reboilers each of which includes a means to hold the distillate being processed, an inlet and an outlet conduit for passage of the distillate through this holding means, a means for heating the distillate being held within the holding means, and means for isolating the atmosphere surrounding the heated distillate from the ambient atmosphere within the main housing. These auxiliary reboilers are arranged in a manner whereby the distillate is routed from the main reboiler successively through each of these auxiliary reboilers and is incrementally reboiled by each auxiliary reboiler to a higher degree of purity. Since the ambient atmosphere of each individual auxiliary reboiler is isolated from the main ambient atmosphere of the distillation apparatus, the problem of the evaporated impurities contacting the condenser coils, and then recondensing and recombining with the distillate has been eliminated. The evaporated contaminants are vented directly to the external atmosphere or removed to a point at a considerable distance away from the auxiliary reboilers. This arrangement insures successive reductions in the overall percentage of impurities in the distillate, and additional stages of reboiling can be added as necessary to achieve a desired level of purity.

It is known in the art that by allowing the rising vapors to make contact countercurrently with the distillate, the vapor will become enriched by removing still more volatile components therefrom, thereby further enhancing the purity of the distillate. With this in mind, an embodiment of the invention can be provided with a venting means disposed so that such a countercurrent flow is produced within the auxiliary reboilers. This arrangement may yield an additional benefit, in that it may allow a reduction in the number of stages of redistillation required to achieve a desired level of purity. Since each stage of redistillation unavoidably involves evaporation and loss of a portion of the desired distillate, less reboiling because of counter-current flow will mean increased efficiency of the still.

BRIEF DESCRIPTION OF THE DRAWING

The several features and advantages of this improvement to a distillation apparatus, constructed in accordance with the invention, will be more readily understood and appreciated from the following detailed description of the preferred embodiments, herein selected for purposes of illustration, as shown in the accompanying drawings in which.

DESCRIPTION OF THE PREFERRED EMBODIMENTS

Figure 1:
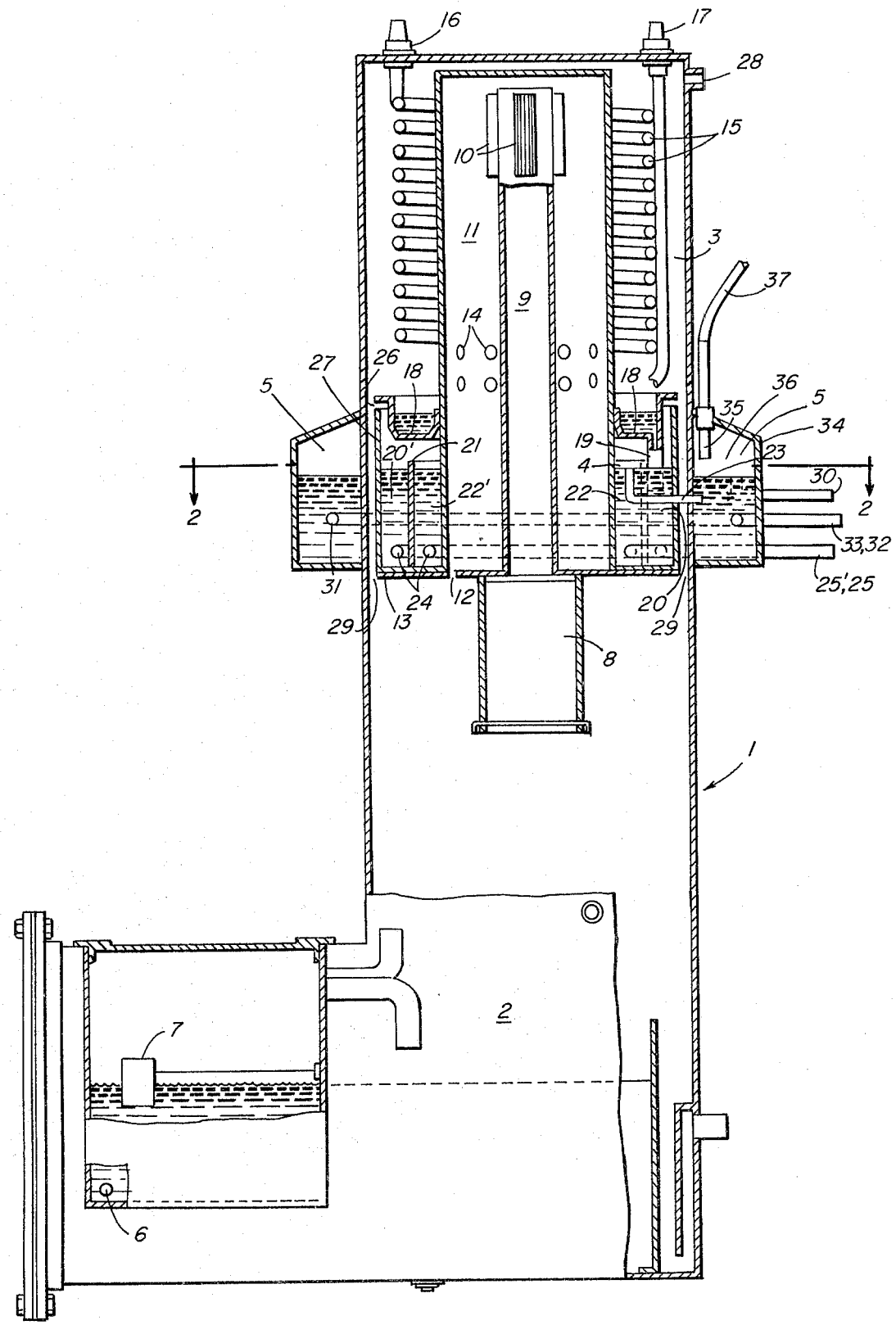
FIG. 1 is an elevation view, in section, of the distillation apparatus of this invention.

In FIG. 1, a distillation apparatus 1 is provided with a lower distillation zone 2, an upper condensation zone 3, a main reboiler 4 and an auxiliary reboiler chamber 5. Impure water is introduced into the distillation zone 2 through an inlet 6 controlled by a float feeder 7 and is heated by means (not shown) to a temperature to evaporate the water therein. The vapor passes upwardly into a filter 8 where entrained solid particles are separated therefrom, into a riser 9, through baffles 10 and into an expansion zone 11. Any material which condenses in expansion zone 11 is recycled through a hole 12 in a plate 13 into the distillation zone 2.

The vapor exits from expansion zone 11 through holes 14, into condensation zone 3. The vapor passes upwardly, contacting condenser tubes 15 which are maintained cold by a coolant entering tubes 15 through an inlet 16 and exiting from an outlet 17. Condensate condensing in zone 3 drips down and is trapped in a trough-shaped cover 18 and is channeled into the main reboiler 4 through a down spout 19. The condensate flows from entrance point 20 through the main reboiler 4 along the path defined by a baffle 21. The direction of flow is from point 20 to point 20' around the edge of baffle 21 and then from point 22' to 22. At point 22 the condensate is removed by means of an overflow conduit 23. Located within the reboiler and along the entire length of the path defined by baffle 21 is a steam pipe 24, having its inlet 25 (see also FIG. 2) at point 20 and its outlet 25' at point 22. The pipe is completely submerged in the condensate at all points and is kept hot enough to boil the condensate throughout, to expel volatile impurities.

The main reboiler 4 is provided with a venting space 26, located between the cover 18 and an outer reboiler wall 27. The cover 18 overlays wall 27 in such a way that no condensate can fall into the reboiler through space 26 and therefore flow of partially reboiled condensate is prevented. To insure that any volatile material which is expelled from any point in the reboiler can vent through space 26, the baffle 21 is made lower than the bottom of cover 18. The reboiled vapors, including the volatile impurities, pass through vent 26 and flow upwardly interacting with condensing tubes 15 and partially condensing, and the remainder exit from the system through a main vent 28. The recondensed vapors and impurities will be recollected in cover 18 to undergo an additional cycle of reboiling. Holes 29 are provided in plate 13 so that any condensed material which is not caught in the cover plate 18 is recycled into distillation zone 2.

The once reboiled distillate exits main reboiler 4 via overflow conduit 23 into the auxiliary reboiler chamber 5. The C-shaped chamber 5 extends around essentially the entire perimenter of main reboiler 4. There is an outlet line 30 located at the opposite end of chamber 5 from conduit 23 so that the flow of distillate will proceed along the entire length of chamber 5. Auxiliary steam heating pipe 31 is disposed within auxiliary reboiler chamber 5 so as to be totally submerged beneath the distillate along the path of flow. Steam enters pipe 31 from an external source (not shown) by inlet port 32 (see also FIG. 2) and exits via outlet port 33. The steam is introduced to provide heat for vaporizing a portion of the enclosed distillate along with the entrapped volatile impurities. Chamber 5 has an enclosing cover portion 34 which isolates the ambient atmosphere within the chamber from the condenser tubes 15. In this respect, the auxiliary reboiler differs in operation from main reboiler 4, since in the main reboiler 4 the vaporized impurities, in being permitted to vent through the main vent 28, pass by the condenser tubes 15 and a portion condenses, recontaminating the distillate. An auxiliary vent 35 communicates with chamber 5 at a point 36 in the general vicinity of conduit 23, and is used to evacuate the vaporized distillate and volatile impurities. A suction line 37 leads from vent 35 to a means external to the distillation apparatus (not shown) for drawing off the vapors.

Figure 2:
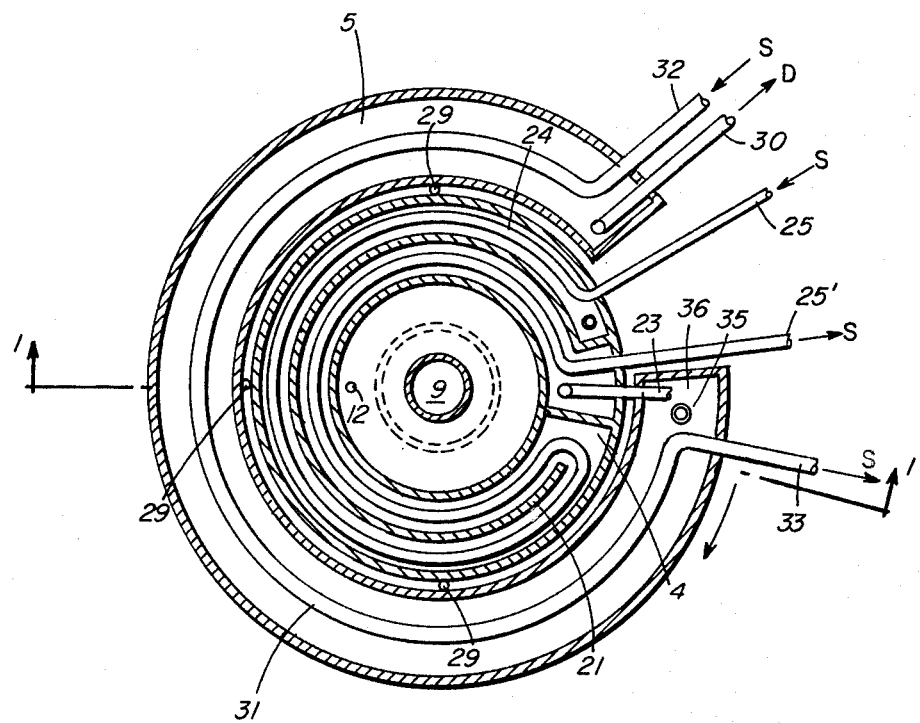
FIG. 2 is a top view, in section, of the apparatus of FIG. 1 as viewed through line 2—2.

FIG. 2 shows in more detail the positioning of auxiliary steam heating pipe 31, conduit 23 and auxiliary vent 35 within auxiliary reboiler 5 and also the disposition of auxiliary reboiler 5 relative to main reboiler 4. The location of auxiliary vent 35 near distillate entry point 36 insures that the vapor flow will be countercurrent to the distillate flow. The vapor-to-distillate countercurrent contact will create a "stripping" action which will cause the vapor to extract even more volatile impurities from the distillate, thus further purifying the distillate. By being vented to a location outside the distillation apparatus, the volatile impurities will be unable to re-enter the distilled condensate, and therefore recontamination will be avoided. Although a portion of the distillate is similarly extracted and is therefore lost as waste, nevertheless the loss is minimal and the resulting extremely high purity distillate is worth the small loss in efficiency. Distilled condensate produced by this preferred embodiment can be expected to be of a purity characterized by a resistivity in excess of 10 megohm-cms. It should be understood, of course, that the foregoing disclosures relate only to the preferred embodiment of the invention and that it intended to cover all changes and modifications of the example of the invention herein chosen, within the purposes of the disclosures, which do not constitute departures from the spirit and scope of the invention.

I claim:

1. A method for distilling a liquid in a distillation apparatus comprising a primary still, a condenser, a main reboiler and at least one auxiliary reboiler, said method comprising:
   (a) vaporizing the liquid in the primary still and passing the vapors through a cooling zone containing the condenser thereby condensing a portion of the vapors and venting the uncondensed vapors out of the apparatus through a first vent provided in the cooling zone;
   (b) collecting the condensate from (a) in the main reboiler and heating said condensate to boil the condensate and to expel volatile impurities;
   (c) passing the vapors from (b) through said cooling zone, thus recondensing a portion, and passing the uncondensed vapors from (b) out through said first vent;
   (d) collecting the recondensed vapors from (c) and returning the condensate to the main reboiler to undergo an additional cycle of reboiling;
   (e) passing condensate from the main reboiler into a zone isolated and sealed from the atmosphere of the vapor space within the primary still and main reboiler;
   (f) boiling the condensate within said isolated zone to vaporize impurities, leaving a purified liquid phase;

(g) venting impurities vaporized in (f) directly to atmosphere and countercurrently to the flow of said condensate into said isolated zone and through a second vent provided in said isolated zone; and (h) recovering the purified liquid phase from said isolated zone.

2. The method of claim 1 further comprising:

(i) providing one or more additional auxiliary reboilers in series, each additional reboiler being sealed from ambient atmosphere and vented; and (j) passing the liquid from (h) successively through each of said additional auxiliary reboilers to incrementally reboil within each to a higher degree of purity.

* * * * *